(12) United States Patent
Choi

(10) Patent No.: US 8,310,756 B2
(45) Date of Patent: Nov. 13, 2012

(54) WINDOW IMAGE PROJECTION SCREEN

(76) Inventor: Hae-Yong Choi, Seoul (KR)

( * ) Notice: Subject to any disclaimer, the term of this patent is extended or adjusted under 35 U.S.C. 154(b) by 0 days.

(21) Appl. No.: 13/279,533

(22) Filed: Oct. 24, 2011

(65) Prior Publication Data

US 2012/0099192 A1    Apr. 26, 2012

(30) Foreign Application Priority Data

Oct. 26, 2010  (KR) .......................... 10-2010-0104336

(51) Int. Cl.
*G03B 21/62* (2006.01)

(52) U.S. Cl. ............ 359/443; 181/5; 181/101; 353/122; 359/445; 359/452

(58) Field of Classification Search .................... 40/329; 52/12; 181/30, 284; 359/208, 275, 359–443
See application file for complete search history.

(56) References Cited

U.S. PATENT DOCUMENTS

| | | | | |
|---|---|---|---|---|
| 3,334,816 A * | 8/1967 | Shuzo Mizuno | ................ | 239/18 |
| 3,811,751 A * | 5/1974 | Myer | .............................. | 349/69 |
| 4,401,368 A * | 8/1983 | Drechsel et al. | ............. | 359/452 |
| 4,974,779 A * | 12/1990 | Araki et al. | ..................... | 239/18 |
| 5,067,653 A * | 11/1991 | Araki et al. | ..................... | 239/18 |
| 5,265,802 A * | 11/1993 | Hobbs et al. | ..................... | 239/18 |
| 5,269,977 A * | 12/1993 | Nakahashi et al. | ............ | 264/1.9 |
| 5,368,228 A * | 11/1994 | Adamson et al. | ................ | 239/18 |
| 5,445,322 A * | 8/1995 | Formhals et al. | ................ | 239/18 |
| 5,609,938 A * | 3/1997 | Shields | ......................... | 428/138 |
| 5,626,016 A * | 5/1997 | Walter | ............................ | 60/532 |
| 6,092,900 A * | 7/2000 | Diedrich et al. | ............. | 353/122 |
| 6,144,550 A * | 11/2000 | Weber et al. | ............. | 361/679.26 |
| 6,426,836 B2 * | 7/2002 | Dorsel et al. | ................... | 359/443 |
| 6,819,487 B2 * | 11/2004 | Palovuori et al. | ............ | 359/443 |
| 6,988,339 B2 * | 1/2006 | Pylkki et al. | ................ | 52/173.3 |
| 7,040,050 B2 * | 5/2006 | Skinner | ......................... | 40/410 |
| 7,198,372 B2 * | 4/2007 | Aeling et al. | .................... | 353/30 |
| 7,215,837 B2 * | 5/2007 | Trutna, Jr. | ........................ | 385/7 |
| 7,697,201 B2 * | 4/2010 | Seki et al. | ..................... | 359/446 |
| 7,747,029 B2 * | 6/2010 | Kim et al. | ..................... | 381/152 |
| 7,780,297 B2 * | 8/2010 | Seki | ............................ | 353/79 |
| 8,033,169 B2 * | 10/2011 | Jung | ........................... | 73/290 V |
| 2003/0145536 A1 * | 8/2003 | Pylkki et al. | ................... | 52/201 |
| 2004/0080820 A1 * | 4/2004 | Palovuori et al. | ............ | 359/443 |
| 2005/0120602 A1 * | 6/2005 | Skinner | ......................... | 40/410 |
| 2009/0049908 A1 * | 2/2009 | Jung | ........................... | 73/290 V |
| 2010/0321478 A1 * | 12/2010 | Sliwa et al. | ..................... | 348/51 |

* cited by examiner

*Primary Examiner* — Clayton E LaBalle
*Assistant Examiner* — Kevin Butler
(74) *Attorney, Agent, or Firm* — Bacon & Thomas, PLLC

(57) ABSTRACT

A window image projection screen includes a transparent case, including a transparent front element and a transparent rear element. A thin inner space formed between the front and rear elements is filled with fine water drops produced by ultrasonic vibration of water in a reservoir to selectively crease a screen for a projected image.

4 Claims, 3 Drawing Sheets

WINDOW IMAGE PROJECTION SCREEN

CROSS-REFERENCE(S) TO RELATED APPLICATION

This application claims priority of Korean Patent Application No. 10-2010-0104336, filed on Oct. 26, 2010, in the Korean Intellectual Property Office, which is hereby incorporated by reference in its entirety.

BACKGROUND OF THE INVENTION

1. Field of the Invention

The present invention relates to a window image projection screen, and more particularly, to a window image projection screen which may be converted into a screen by injecting fine water drops within the screen using ultrasonic waves for use a projector (generator) for the drops, and which may be converted into a general transparent window through which outdoor sights can be viewed clearly from indoors or indoor sights can be viewed clearly from outdoors when it is not used.

2. Description of the Related Art

In general, in prior screen configurations which are attached to glasses using refraction rates of liquid crystals, the images transmitted at high-projection angles greater than a predetermined projection angle are image-formed using the high refraction rates of liquid crystals, and thus pictures thereof are not fully clear and the screen configurations have to be used with projectors having high-projection angles.

Additionally, in other prior screens configured in such a manner that opaque layers are added to the general glasses to form like semi-transparent screens, the images from projectors are used and image efficiencies of the screens are less than 10% which are considered to result in unclear images. Accordingly, the opposite side viewers may see directly and uncomfortably the projected light and further indoor sights are seen to be unclear through the semi-opaque glass when it is not used.

SUMMARY OF THE INVENTION

The present invention has been proposed to solve the drawback as described above and an aspect of the present invention is directed to a window image projection screen which may be used as a window image advertising screen for a show window advertising device, an automobile dealer shop or café with the image being clear, and also may be used as a transparent glass window through which a viewer can see outside or inside. Furthermore, the window image projection screen may be used with a general projector.

As background, a humidifier/dehumidifier may use the principle of water that is formed or broken up into fine water drops through application of electric energy. That is, in a centrifugal spraying type-humidifier/dehumidifier, fine water drops are blown using a centrifugal force and they collide to form particles. In addition, in an ultrasonic humidifier/dehumidifier, electric signals of a predetermined frequency are produced in an electric circuit and transferred to a vibrator disposed in water to produce ultrasonic wave so that smog may be formed through cavitations (a vacuum produced following a propelled object). The above two principles are used in the present invention.

A window image projection screen according to the present invention may include a projector, a transparent case 1 made of transparent material such as glass, provided with a transparent front element or plate 1a and a transparent rear element or plate 1b, a thin inner space 2 formed between the transparent front element 1a and the transparent rear element 1b, a water reservoir 4 disposed on a lower part of the inner space 2; and a vibration unit 3 provided with an ultrasonic vibrator wherein, when the vibration unit 3 is operated, the window image projection screen serves as an image screen for the projector 6, and when the vibration unit 3 is not operated, the window image projection screen becomes clear to view inside or outside.

According to the present invention, a window image projection screen is provided with a transparent case 1 of transparent material such as glass or a thin film and an inner space 2 formed therein. Here, a thickness or gap of the inner space may be 0.1-50 mm and into which fine water drops may be injected and accumulated therein through contact between a vibration plate made of ceramic and water due to vibration of a vibration unit to fill the inner space 2 of the transparent case with fine drops and thus make the inner space 2 to be unclear (opaque), and thereby serving as a screen. Furthermore, in case where the vibration unit is not operated, the inner space of the transparent case 1 may remain clear through which a viewer can see outside or inside.

BRIEF DESCRIPTION OF THE DRAWINGS

The above and other aspects, features and advantages of certain exemplary embodiments of the present invention will be more apparent from the following description taken in conjunction with the accompanying drawings, in which.

DETAILED DESCRIPTION OF EXEMPLARY EMBODIMENTS

Figure 1:
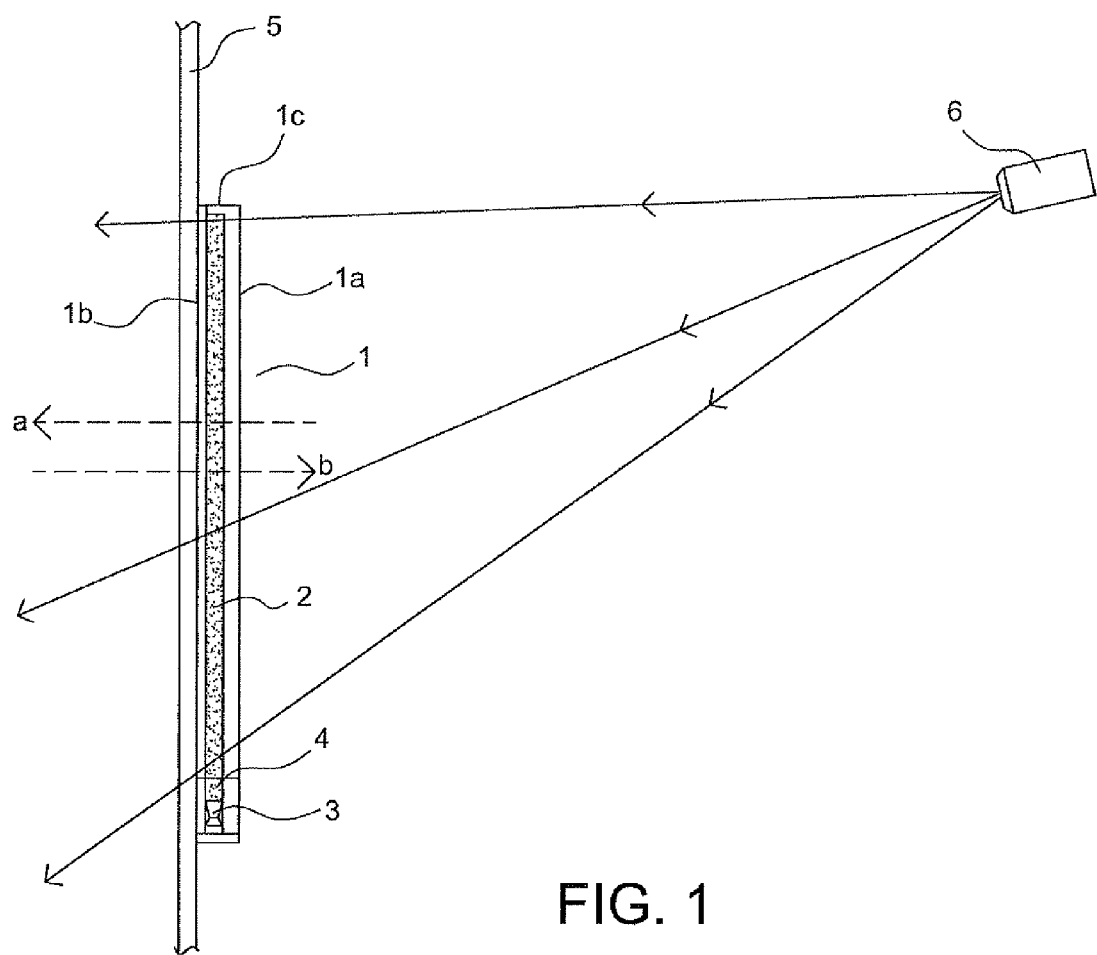
FIG. 1 is a perspective view of a window image projection screen according to an embodiment of the present invention.

Exemplary embodiments of the present invention will be described below in detail with reference to the accompanying drawings. Wherever possible, the same reference numerals will be used to refer to the same elements throughout the specification, and a duplicate description thereof will be omitted.

Figure 2:
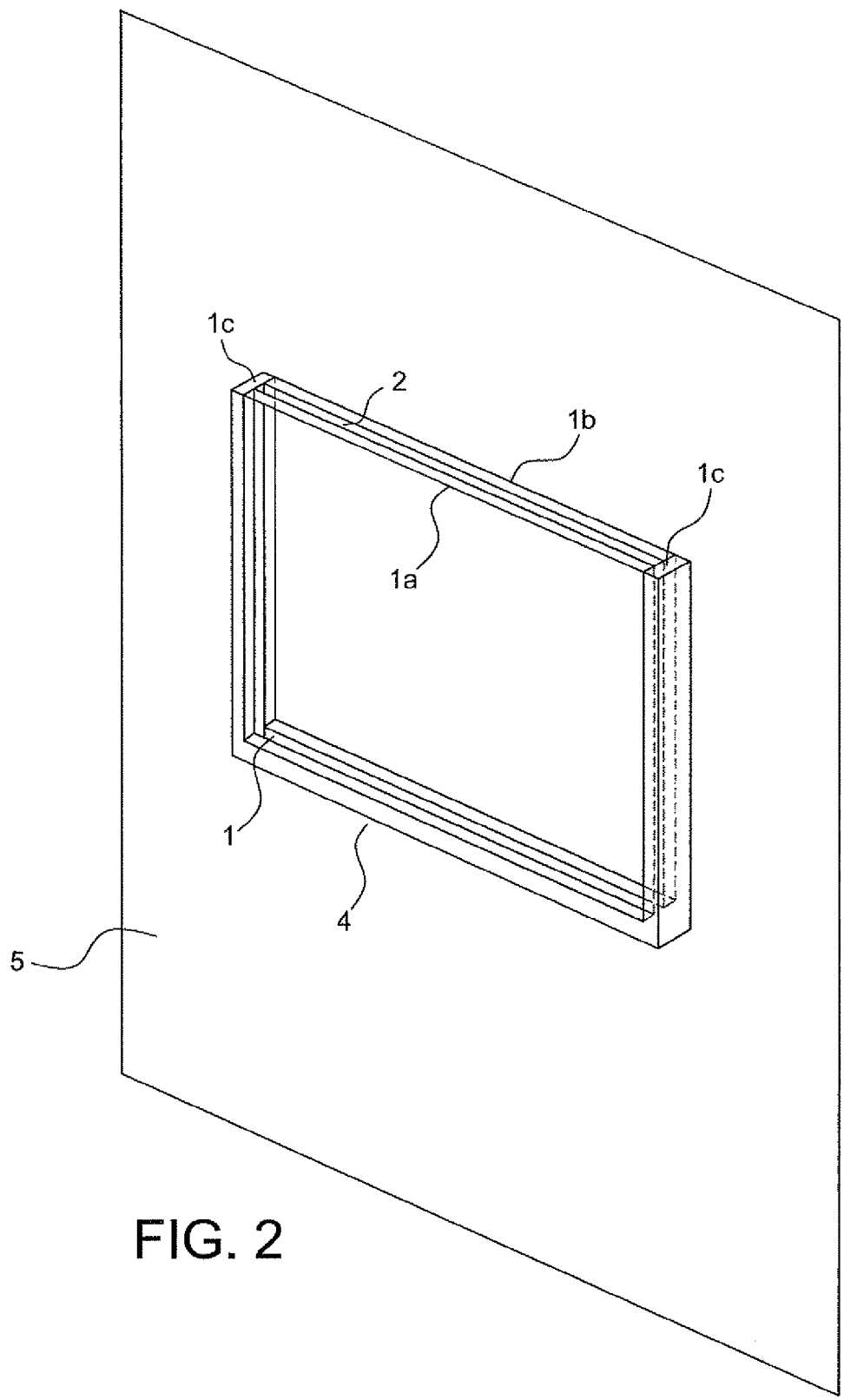
FIG. 2 is a perspective view of the screen which is added to a window according to an embodiment of the present invention.
Figure 3:
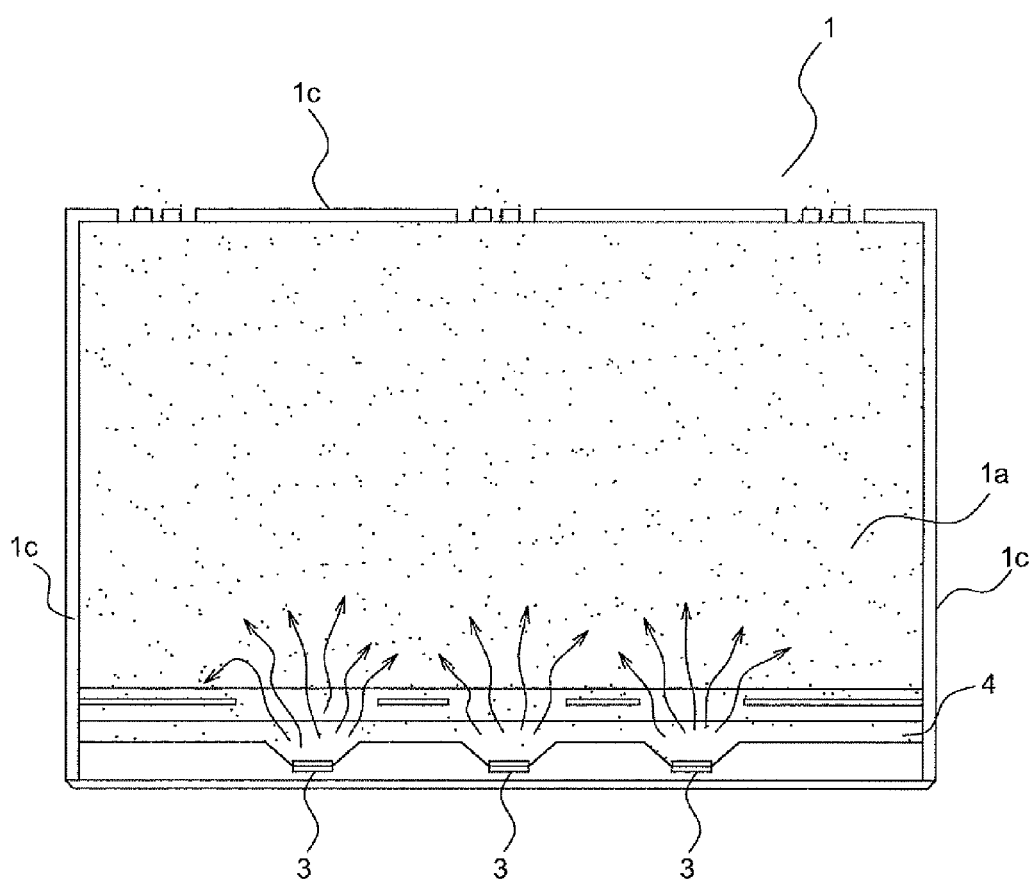
FIG. 3 is a perspective view showing an operation of the window image projection screen according to an embodiment of the present invention.

As shown in FIGS. 1 and 2, a transparent case or screen 1 is made of a thin film of transparent material such as glass and plastic wherein the transparent case 1 may include a transparent front element 1a, a transparent rear element 1b, an inner space 2 having a thickness or gap of 0.1-50 mm between the front element and rear element and a transparent element 1c up-down ward and left-right ward for finishing the transparent case 1. Here, a vibration unit 3 made of ceramic may be provided on a lower part of the inner space 2 and further a water reservoir 4 may be provided on a upper surface of the vibration unit 3 and which is filled with water. The vibration unit 3 may produce ultrasonic vibrations in connection with an ultrasonic generator.

According to the present invention, as shown in FIG. 1, a window image projection screen may be arranged on a glass window 5 and a projector 6 may be provided inside the glass window 5. When a switch provided on the ultrasonic generator is turned on, in case of the projector being operated, the water in the water reservoir 4 is vibrated by the ultrasonic vibration caused through the vibration unit 3 to create and fill the inner space 2 with fine water drops, which thereby enables forming an image projected from the projector 6, i.e., the water reservoir 4 is arranged to communicate with the inner space 2, so that the fine water drops flow into the thin inner space 2. At this time, fine water drops formed by the ultrasonic vibration are very fine and thus images of clear and high definition will be formed.

However, if the thickness or gap dimensional of the inner space 2 is too large during this procedure, a focal point of a projector 6 will be out of its depth and a density of the inner space 2 is decreased and thus the interval of the thickness or gap of the space should be less than 50 mm.

Further, when the thickness of the inner space 2 is too narrow or less than 0.1 mm, it is difficult for water fine drops which result from the ultrasonic vibrations to be input into the inner space 2.

A heater may be further provided to maintain an appropriate temperature of the water reservoir to avoid fine water drops being frozen during the winter season.

According to the present invention, as shown in FIG. 1, when the projector 6 is operated and at the same time the water stored in the water reservoir connected to the vibration unit 3 is injected to make an image screen and further when the projector 6 is stopped operating, the ultrasonic vibration occurred at a lower part of a transparent case 1 is stopped and thus the fine water drops disposed within the inner space 2 revert to (coalesce to) liquid water which returns to the water reservoir 4. At this time, the transparent case becomes clear for viewing from outside to inside, or from inside to outside.

Accordingly, the window image projection screen according to the present invention may be used as an image screen configuration in case where it is used as an advertising device for projecting images in an automobile show room or a beer café, or may be used just as a window screen when an image is not projected.

Specially, according to the window image projection screen of the present invention, a problem of a window sight field being blocked like prior screen configurations applied to a glass window is solved.

In addition, in case where a window image projection screen is formed integrally with a glass window, it may be used as an image advertising screen, or in case where a window image projection screen is formed separately, it may be used as a window for viewing inside.

Meanwhile, if necessary, the water reservoir 4 and the vibration unit 3 may be formed outside separately from the transparent case 1 and connected to an inner space 2 through a hose, and the injected fine water drops may be inputted from outside the case to the inner space 2.

According to the present invention, in case where a window image projection screen is used as a screen configuration, water may be divided into fine drops through an ultrasonic vibration to fill an inner space of a transparent case and to thereby provide a clear screen configuration. Further, in case where the window image projection screen is not used, the inner space of the transparent case may not be filled with the fine water drops and thus remains clear, that is, a sight field therefrom will not be blocked to see outside or inside.

According to the window image projection screen, images 2-10 times clearer than prior art liquid crystal devices or semi-transparent screens can be viewed. Further, in case where the window image projection screen is not used as a screen configuration, inside or outside can be seen through a transparent configuration of a transparent glass with two times the transparency of prior art liquid crystal devices or semi-transparent screen.

In addition, the window image projection screen may be used with a general projector which does not require a specific projection angle.

While the invention has been shown and described with reference to exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. An image projection screen comprising:
    a transparent screen comprising a transparent front element and a transparent rear element;
    a thin inner space between the transparent front element and the transparent rear element, wherein said thin inner space has a thickness of 0.1-50 mm;
    a water reservoir including water, said water reservoir arranged to communicate fine water drops of the water to the thin inner space; and
    a vibration unit including an ultrasonic vibrator, said vibration unit configured to inject ultrasonic vibrations into the water of the reservoir to create said fine water drops,
    wherein, when the vibration unit is operated, the communication between the water reservoir and inner space allows the fine water drops to flow into the thin inner space so that the image projection screen is configured to serve as an image screen for a projector, and
    wherein, when the vibration unit is not operated, the fine water drops are not formed so that the image projection screen is transparent to enable viewing from inside or outside the image projection screen.

2. The image projection screen of claim 1, wherein the transparent screen is coupled to a glass window in a manner enabling viewing through both the glass window and the transparent front and rear elements.

3. The image projection screen of claim 1, wherein the water reservoir and the vibration unit are formed outside separately from the inner space, and injected fine water drops are inputted into the inner space through a hose.

4. The image projection screen of claim 1, wherein the water reservoir and vibration unit are located at a lower area of the inner space.

* * * * *